United States Patent [19]

Brackett

[11] Patent Number: 4,590,812
[45] Date of Patent: May 27, 1986

[54] DEVICE FOR CONVERTING BETWEEN ROTARY AND RECTILINEAR MOTION

[76] Inventor: Douglas C. Brackett, 59 A St., Manchester, N.H. 03102

[21] Appl. No.: 504,934

[22] Filed: Jun. 16, 1983

[51] Int. Cl.[4] ...................... F16H 25/08; F16H 25/16
[52] U.S. Cl. ..................... 74/55; 123/197 R
[58] Field of Search ........................ 74/55; 123/197 R

[56] References Cited

U.S. PATENT DOCUMENTS

| | | | |
|---|---|---|---|
| 947,233 | 1/1910 | Hammond | 123/197 R |
| 1,663,927 | 3/1928 | Voreaux | 123/197 R |
| 1,789,207 | 1/1931 | Williams | 123/197 R |
| 2,398,337 | 4/1946 | Vissat | 123/197 R |
| 2,404,906 | 7/1946 | Heald | 123/197 R |
| 2,444,103 | 6/1948 | Kuhn | 123/197 R |
| 2,628,602 | 2/1953 | Butterfield | 123/197 R |
| 2,775,128 | 12/1956 | Young | 123/197 R |
| 3,064,559 | 11/1962 | Troer | 123/197 R |
| 3,087,342 | 4/1963 | Caddell | 74/36 |
| 3,175,544 | 3/1965 | Hughes | 123/197 R |
| 3,386,429 | 6/1968 | Trammell, Jr. | 123/197 R |
| 3,441,012 | 4/1969 | Trammell, Jr. | 123/197 R |
| 3,482,561 | 12/1969 | Trammell, Jr. | 123/197 R |
| 3,487,818 | 1/1970 | Dineen | 123/197 R |
| 3,625,073 | 12/1971 | Dixon et al. | 74/55 |
| 3,693,464 | 9/1972 | Wieckmann | 74/52 |
| 3,894,522 | 7/1972 | Bennett | 123/197 R |
| 4,054,115 | 10/1977 | Habsburg-Lothringen | 123/197 R |
| 4,073,196 | 2/1978 | Dell | 74/52 |
| 4,078,439 | 3/1978 | Iturriago-Notario | 74/53 |
| 4,289,040 | 9/1981 | Haluko, Jr. | 74/55 |

FOREIGN PATENT DOCUMENTS 2064049  6/1981  United Kingdom .................... 74/55

*Primary Examiner*—Ronald C. Capossela
*Attorney, Agent, or Firm*—Lerner, David, Littenberg, Krumholz & Mentlik

[57] ABSTRACT

A reciprocating slide carrying one fixed and one moveable rotary bearing in an open portion of the slide frame. A rotary crank connected to the moveable rotary bearing causes the slide to reciprocate when the crank is rotated and vice versa.

12 Claims, 5 Drawing Figures

DEVICE FOR CONVERTING BETWEEN ROTARY AND RECTILINEAR MOTION

BACKGROUND OF THE INVENTION

1. Field of the Invention

The present invention relates to rotary to reciprocating and reciprocating to rotary converters in which the side thrust normally associated with connecting rods is reduced by use of a slide connected to a crank shaft by rotary bearing combinations.

2. Description of the Prior Art

The best known types of conversion between rotary and rectilinear motion utilize a crank and connecting rod or eccentric and pitman arm. Side thrust is a problem when rods are driven by pistons to operate cranks at constant velocity rotation, the pitman is limited to dead periods at each extreme and maximum velocity at halfway points.

U.S. Pat. Nos. 947,233; 2,775,128; and 4,078,439 helped overcome side thrust by using slides connected to a crank or eccentric through a rotary bearing mounted in a relatively large revolving disk. These revolving disks have to be mounted in bearing races and are expensive and limited to circle configurations with diameters less than the slide width.

SUMMARY OF THE INVENTION

It has now been found that the large bearing surfaces provided by the rotating disks of the prior art have no real advantage since the stress against the bearing is always essentially at a point and the bearing does not distribute the pressure to any substantial degree. Thus in accordance with the invention the large revolving disc is replaced with a relatively small rotary bearing mounted at a fixed position on the slide. A rotary bearing mounted on a crank pin or eccentric rides against the fixed rotary bearing and against an arcuate wall of the slide. A greater selection of velocity curves is available in the motion conversion operation of the present invention.

DESCRIPTION OF THE PREFERRED EMBODIMENTS

Figure 1:
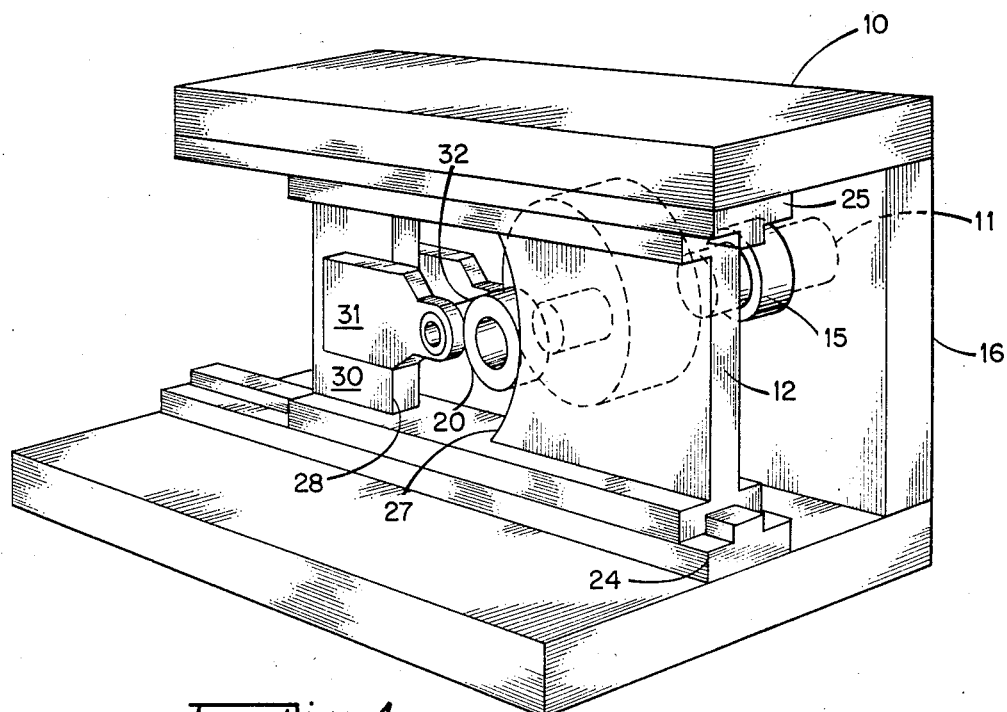
FIG. 1 is an isometric drawing of a motion converter according to the invention.

FIG. 1 depicts an arrangement of the inventive motion converter in which the opertive parts are supported in an open frame 10. Shaft 11 extending through the left side of the frame is a rotary shaft and slide 12 extending through frame 10 at right angles to the axis of shaft 11 reciprocates in rectilinear fashion as depicted. Shaft 11 is supported in bearing 15 mounted in bearing block 6. Bearing block 16 in turn is supported by frame 10. Bearing 15 may be any conventional type of bearing for rotary motion such as ball bearings, roller bearings or sleeve bearings.

Between bearing 15 and slide 12, shaft 11 has eccentric arm 18 which passes through bearing 20 located in opening 21 in slide 12. Slide 12 is held in frame 10 by track rails 24 and 25, which are mounted fixed to frame 10. Slide 12 rides on tracks 24 and 25 to move freely transverse to the axis of shaft 11 while motion is prevented in the direction parallel to the axis of shaft 11. Slide 12 has aperture 21, which is more easily described by reference to FIG. 2. As will be seen in FIG. 2, aperture 21 has arcuate wall 27 facing one direction of slide motion and a straight wall 28 facing the other direction of slide motion. One end 30 of slide 12 holds support arm 31 supporting rotary bearing 32 in a fixed location in slide aperture 21. Rotary bearing 32 and rotary bearing 20 have diameters such that bearing 20 fits snuggly between arcuate wall 27 and bearing 32. The curvatures of arcuate wall 27 and bearing 32 permit bearing 20 to roll back and forth along the wall 27 and around bearing 32 in continuous contact with both in order to cover the eccentric motion of arm 18.

Figure 2:
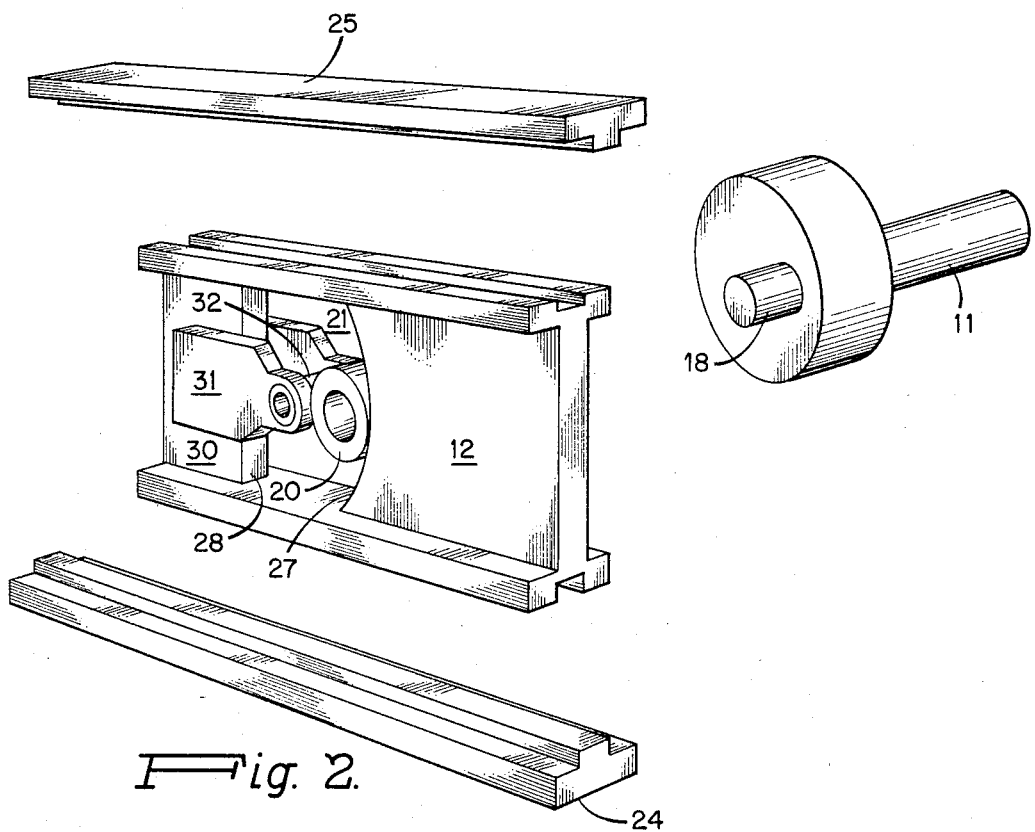
FIG. 2 is an exploded view of the operative parts of FIG. 1.

Referring to FIG. 2 and assuming that shaft 11 is rotating clockwise, we can define the rotational point at which arm 18 appears to be furthest away from us in the drawing as 0°. That would put slide 12 at one extreme position. With arm 18 closest to us, slide 12 would be at the opposite extreme position which can be called 180°. The extreme side positions of arm 18 in slide 12 will then be 90° and 270°. Again looking at FIG. 2 it will be seen the when arm 18 moves from a 90° position to the 180° position it must pass over bearing 32. This requires that slide 12 move over less during this 90° of rotation of shaft 11 then it will have moved during the proceeding 90° of rotation. This is a nonlinearity not found in the closest comparable device of the prior art. In appropriate types of machine movements, such a nonliearity is desirable.

It will be seen that, if shaft 11 is rotated at a constant speed, the variation in reciprocating velocity of slide 12 will be fairly substantial. If the reciprocating motion of slide 12 is made uniform, the rotational velocity of shaft 11 will vary, the variations being over and beyond that normally encountered with a rotating crank and pitman arm. Not only that, but the amount of the variation can be determined, to a degree, by the relative sizes of bearings 20 and 32. As bearing 32 is made smaller and bearing 20 made larger, the nonlinearity in slide velocity will decrease. An example of the sort of situation where this kind of operation can be deisirable is in a cyclical opertion in which only a portion of the cycle provides work which is desirably performed at a predetermined speed while the rest of the cycle is lost time. Using the present invention with such a machine, the slower part of the cycle of the inventive converter is set at the predetermined speed for performing the work so that the lost time of the cycle then goes at a faster speed. The power ratios are also improved in this type of cycle. It should be recognized that in the ususal crank and piston arrangement, as found in an internal combustion engine, there is a finite dead time for the piston at what is known as top dead center. When a piston is connected to the far end of slide 12 of FIG. 2, the dead time for that piston at top dead center could be reduced greatly. Again the exact amount of dead time can be controlled by a selection of radius parameters.

It will be recognized also that arcuate end wall 27 must have a constant radius from the axis of bearing 32 and the motion of arm 18 must also be at a constant radius from the axis of bearing 32.

Figure 3:
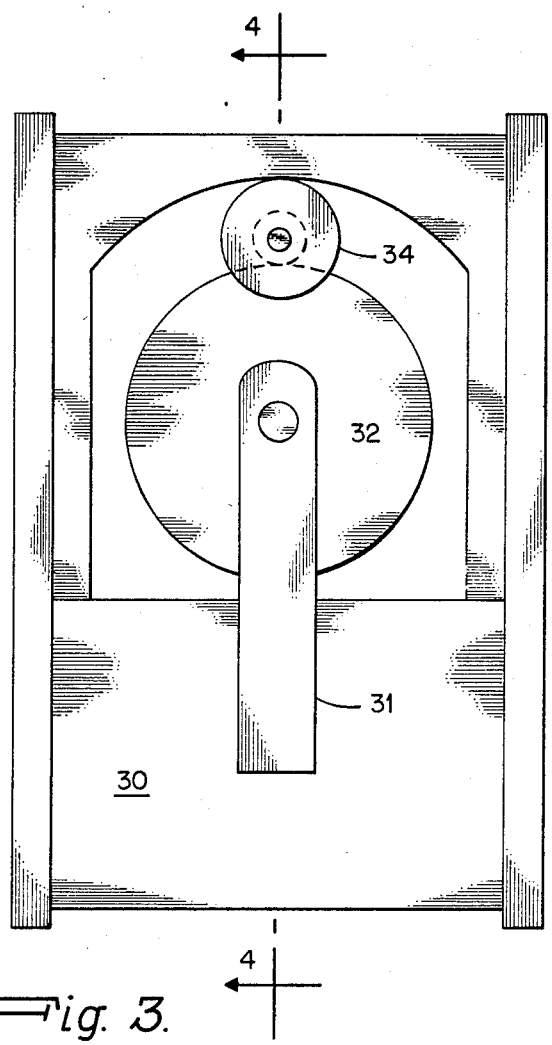
FIG. 3 is a side elevation of a second embodiment of a motion converter according to the invention.
Figure 4:
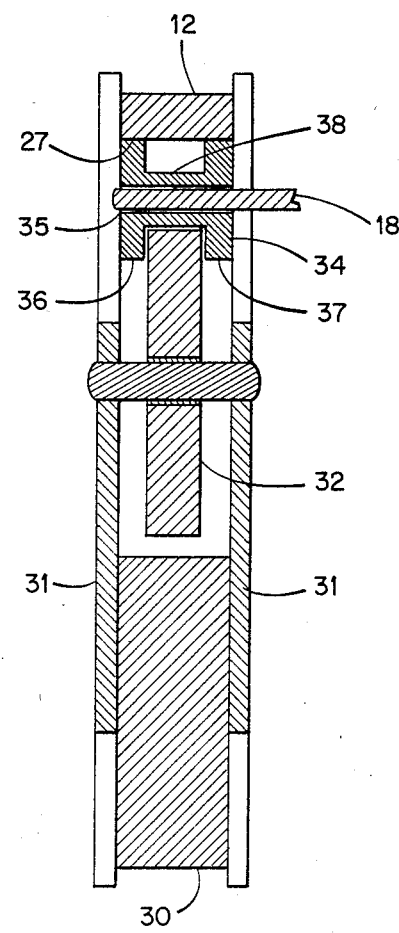
FIG. 4 is a cross-section taken along line 4—4 of FIG. 3.

The nonlinear parameters can be controlled to even greater degree in accordance with the embodiments of FIGS. 3 and 4. As depicted in FIGS. 3 and 4, bearing 20 is replaced by a bearing 34, which has two bearing surfaces of different diameters. This is best described in reference to FIG. 4 in which arm 18 is depicted inside internal bearing sleeve 35. The outside of bearing 34 is spool-shaped so that each of its ends, 36 and 37 has a larger diameter than its central portion 38. Only central portion 38 of bearing 34 bears against bearing 32 and only end portions 36 and 37 of bearing 34 bear against arcuate wall 27.

Figure 5:
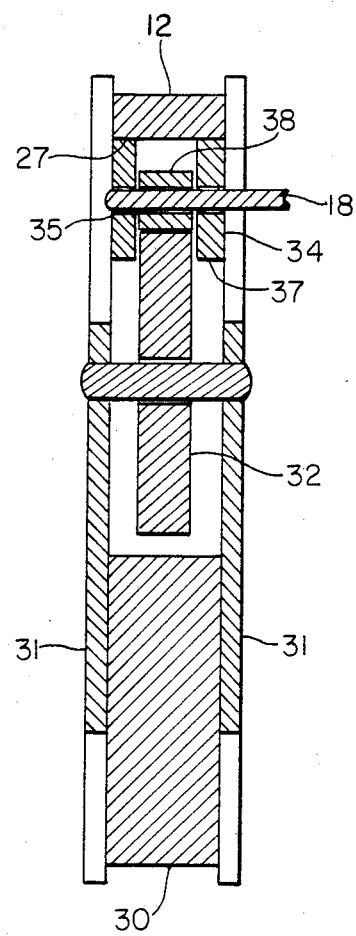
FIG. 5 is a cross-section similar to FIG. 4 showing a modified version of the second motion converter embodiment.

It is to be understood that bearing 34 revolves freely around arm 18 as does bearing 22 (FIGS. 1 and 2). Ends 36 and 37 are suitably a single integral piece with central portion 38, machined or molded to the different diameters shown. Thus ends 36 and 37 in operation would revolve at the same rotational rate as center portion 38. This is not critical to the invention however and it will make no real differene if ends 36 and 37 are free to revolve at a different rate from central portion 38 by making the ends 36 and 37 separate from the central portion 38 as shown in FIG. 5.

While the invention has been described with respect to specific embodiments, variations obvious to those skilled in the art are contemplated and it is the intention to cover the invention as set forth in the following claims.

I claim:

1. A device for converting linear motion to rotary motion or vice versa, comprising a rotatable crank, having a crankpin and a bearing element rotatably mounted on said crankpin, and a slide mounted for reciprocating linear movement, said slide including a first arcuate bearing surface located on one side of said crankpin in continuous engagement with said bearing element as said bearing element moves back and forth along said first arcuate bearing surface and a second arcuate bearing surface located on an opposite side of said crankpin in continuous engagement with said bearing element as said bearing element moves back and forth along said second arcuate bearing surface, said second arcuate bearing surface being rotatable in response to the rotation of said bearing element, whereby the linear motion of said slide is continuously converted into the rotary motion of said crank or vice versa.

2. The device of claim 1, wherein said second arcuate bearing surface is rotatable about an axis which is fixed relative to said slide.

3. The device of claim 2, wherein said first arcuate bearing surface is a wall having a curvature that follows a radius extending from said axis of said second arcuate bearing surface.

4. The device of claim 3, wherein said bearing element has a diameter and said second arcuate bearing surface has a radius, the sum of the diameter of said bearing element and the radius of said second arcuate bearing surface being equal to the radius of said wall.

5. The device of claim 1, wherein said bearing element is a first rotary bearing and said second arcuate bearing surface is an outer circumferential edge of a second rotary bearing.

6. The device of claim 5, wherein said first rotary bearing has a diameter and said second rotary bearing has a diameter which is greater than the diameter of said first rotary bearing.

7. The device of claim 5, wherein said first rotary bearing has a diameter and said second rotary bearing has a diameter which is less than the diameter of said first rotary bearing.

8. The device of claim 1, wherein said bearing element is spool-shaped such that said bearing element includes two opposed ends having a first diameter and a central portion having a second diameter which is less than said first diameter, said two opposed ends being in continuous contact with said first arcuate bearing surface and said central portion being in continuous contact with said second arcuate bearing surface.

9. The device of claim 8, wherein said two opposed ends of said bearing element are integral with said central portion of said bearing element.

10. The device of claim 8, wherein said two opposed ends of said bearing element are separate from said central portion of said bearing element.

11. The device of claim 1, wherein said first and second arcuate bearing surfaces define an arcuate slot and said bearing element rolls back and forth along said slot.

12. The device of claim 11, wherein said bearing element rotates in one direction as said bearing element rolls along said arcuate slot from one end thereof to an opposite end thereof and said bearing element rotates in an opposite direction as said bearing element rolls along said arcuate slot from said opposite end thereof to said one end thereof.

* * * * *

UNITED STATES PATENT AND TRADEMARK OFFICE
CERTIFICATE OF CORRECTION

PATENT NO. : 4,590,812

DATED : May 27, 1986

INVENTOR(S) : Douglas C. Brackett

It is certified that error appears in the above-identified patent and that said Letters Patent is hereby corrected as shown below:

Col. 1, line 66, "block 6" should read --block 16--;

Col. 2, line 31, "seen the" should read --seen that--;

Col. 2, line 34, "proceeding" should read --preceding--;

Col. 2, line 37, "nonliearity" should read --nonlinearity--;

Col. 2, line 50, "deisirable" should read --desirable--;

Col. 2, line 51, "opertion" should read --operation--; and

Col. 2, line 59, "ususal" should read --usual--.

Signed and Sealed this

Thirtieth Day of December, 1986

Attest:

DONALD J. QUIGG

Attesting Officer

Commissioner of Patents and Trademarks